US008615191B2

(12) United States Patent
Sagae et al.

(10) Patent No.: US 8,615,191 B2
(45) Date of Patent: Dec. 24, 2013

(54) DISTRIBUTION APPARATUS, TERMINAL APPARATUS, SYSTEM, AND METHOD

(75) Inventors: Yuta Sagae, Kawasaki (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 397 days.

(21) Appl. No.: 13/060,642

(22) PCT Filed: Aug. 12, 2009

(86) PCT No.: PCT/JP2009/064270
§ 371 (c)(1),
(2), (4) Date: Jun. 17, 2011

(87) PCT Pub. No.: WO2010/026858
PCT Pub. Date: Mar. 11, 2010

(65) Prior Publication Data
US 2011/0237179 A1    Sep. 29, 2011

(30) Foreign Application Priority Data

Sep. 5, 2008    (JP) .................................. 2008-228998

(51) Int. Cl.
*H04H 20/71* (2008.01)
(52) U.S. Cl.
USPC .......... 455/3.01; 455/132; 455/149; 455/272; 455/500
(58) Field of Classification Search
USPC ....................................................... 455/3.01
See application file for complete search history.

(56) References Cited

U.S. PATENT DOCUMENTS

| | | | | |
|---|---|---|---|---|
| 5,301,359 A * | 4/1994 | Van den Heuvel et al. | ... | 455/524 |
| 5,553,315 A * | 9/1996 | Sobti et al. | ...... | 455/509 |
| 6,366,582 B1 * | 4/2002 | Nishikado et al. | ...... | 370/401 |
| 6,411,620 B1 * | 6/2002 | Takase et al. | ...... | 370/390 |
| 6,532,417 B2 * | 3/2003 | Hatano | ...... | 701/420 |
| 6,546,537 B1 * | 4/2003 | Komoda | ...... | 716/120 |
| 6,553,355 B1 * | 4/2003 | Arnoux et al. | ...... | 706/13 |
| 6,680,915 B1 * | 1/2004 | Park et al. | ...... | 370/254 |

(Continued)

FOREIGN PATENT DOCUMENTS

| | | |
|---|---|---|
| JP | 11 196465 | 7/1999 |
| JP | 2000 23239 | 1/2000 |

(Continued)

OTHER PUBLICATIONS

Office Action issued May 15, 2012 in Japanese Patent Application No. 2008-228998 (with English translation).

(Continued)

*Primary Examiner* — Hai V Nguyen
(74) *Attorney, Agent, or Firm* — Oblon, Spivak, McClelland, Maier & Neustadt, L.L.P.

(57) ABSTRACT

A distribution apparatus which distributes to multiple regions includes: a storage unit which stores each of radio communications systems usable for each of the regions; a selecting unit which selects, out of the multiple regions to which the distribution apparatus distributes, first regions in which a radio communications system in operation is the same; and a distribution unit which distributes, based on each of the radio communications system usable for each of the regions that is stored in the storage unit, all or some of information on the radio communications system for each of the first regions selected by the selecting unit. One or multiple radio communications systems are usable in each of the regions.

19 Claims, 12 Drawing Sheets

(56) References Cited

U.S. PATENT DOCUMENTS

| | | | |
|---|---|---|---|
| 6,795,070 B1* | 9/2004 | Laurent-Chatenet et al. | 345/423 |
| 6,825,839 B2* | 11/2004 | Huang et al. | 345/423 |
| 6,856,208 B2* | 2/2005 | Lee et al. | 331/55 |
| 6,999,629 B1* | 2/2006 | Lechat et al. | 382/240 |
| 7,003,169 B1* | 2/2006 | Lechat et al. | 382/240 |
| 7,046,669 B1* | 5/2006 | Mauger et al. | 370/393 |
| 7,054,634 B2* | 5/2006 | Watanabe et al. | 455/440 |
| 7,170,852 B1* | 1/2007 | Adler | 370/223 |
| 7,185,305 B1* | 2/2007 | Rodman | 716/127 |
| 7,222,169 B2* | 5/2007 | Koshimizu et al. | 709/224 |
| 7,272,608 B2* | 9/2007 | Udeshi et al. | 1/1 |
| 7,285,487 B2* | 10/2007 | DeHon et al. | 438/618 |
| 7,295,552 B1* | 11/2007 | Kadambi et al. | 370/392 |
| 7,346,219 B2* | 3/2008 | Demaret et al. | 382/248 |
| 7,512,179 B2* | 3/2009 | Sanson et al. | 375/240.12 |
| 7,551,634 B2* | 6/2009 | Nabae | 370/408 |
| 7,596,152 B2* | 9/2009 | Yarvis et al. | 370/503 |
| 7,676,236 B2* | 3/2010 | Nanda et al. | 455/509 |
| 7,733,869 B2* | 6/2010 | Fischer et al. | 370/395.1 |
| 7,733,891 B2* | 6/2010 | Reynolds et al. | 370/412 |
| 7,738,401 B2* | 6/2010 | Elias et al. | 370/254 |
| 7,783,360 B2* | 8/2010 | Zdravkovic et al. | 607/62 |
| 7,792,099 B2* | 9/2010 | Yasukawa et al. | 370/386 |
| 7,793,104 B2* | 9/2010 | Zheng et al. | 713/171 |
| 7,801,857 B2* | 9/2010 | Betts et al. | 707/628 |
| 7,818,018 B2* | 10/2010 | Nanda et al. | 455/509 |
| 7,924,745 B2* | 4/2011 | Hirano et al. | 370/254 |
| 7,933,278 B2* | 4/2011 | Lee | 370/400 |
| 7,936,681 B2* | 5/2011 | Gong et al. | 370/238 |
| 7,944,817 B1* | 5/2011 | Sylvain | 370/228 |
| 7,958,271 B2* | 6/2011 | Zou et al. | 709/224 |
| 7,974,220 B2* | 7/2011 | Elias et al. | 370/254 |
| 7,978,725 B2* | 7/2011 | Gong et al. | 370/445 |
| 7,990,374 B2* | 8/2011 | Itkowitz et al. | 345/419 |
| 8,014,336 B2* | 9/2011 | Bertinelli et al. | 370/315 |
| 8,019,341 B2* | 9/2011 | Falk et al. | 455/434 |
| 8,023,521 B2* | 9/2011 | Woo et al. | 370/412 |
| 8,031,738 B2* | 10/2011 | Kuo | 370/439 |
| 8,036,330 B2* | 10/2011 | Nelson | 375/356 |
| 8,037,305 B2* | 10/2011 | Rahman et al. | 713/168 |
| 8,081,582 B2* | 12/2011 | Saleh et al. | 370/254 |
| 8,081,618 B2* | 12/2011 | Tseng | 370/349 |
| 8,094,149 B2* | 1/2012 | Tian et al. | 345/419 |
| 8,144,621 B2* | 3/2012 | Fujita et al. | 370/254 |
| 8,160,044 B2* | 4/2012 | Tseng | 370/342 |
| 8,205,182 B1* | 6/2012 | Zlatanovici et al. | 716/125 |
| 8,233,489 B2* | 7/2012 | Welin et al. | 370/395.32 |
| 8,249,578 B2* | 8/2012 | Yagyu et al. | 455/420 |
| 8,286,111 B2* | 10/2012 | Chandra et al. | 716/110 |
| 8,294,568 B2* | 10/2012 | Barrett | 340/539.11 |
| 8,295,859 B1* | 10/2012 | Yarkan et al. | 455/456.6 |
| 8,311,539 B2* | 11/2012 | Luo et al. | 455/434 |
| 8,325,706 B2* | 12/2012 | Pacella | 370/351 |
| 8,396,001 B2* | 3/2013 | Jung et al. | 370/252 |
| 8,400,974 B2* | 3/2013 | Mueck et al. | 370/329 |
| 8,433,252 B2* | 4/2013 | Nibe | 455/69 |
| 8,462,783 B2* | 6/2013 | Dong et al. | 370/392 |
| 2002/0094813 A1* | 7/2002 | Koshimizu et al. | 455/436 |
| 2002/0094817 A1* | 7/2002 | Rune et al. | 455/450 |
| 2004/0202146 A1* | 10/2004 | Lee | 370/350 |
| 2005/0192037 A1* | 9/2005 | Nanda et al. | 455/509 |
| 2005/0239443 A1* | 10/2005 | Watanabe et al. | 455/414.1 |
| 2007/0250713 A1* | 10/2007 | Rahman et al. | 713/171 |
| 2008/0020792 A1* | 1/2008 | Falk et al. | 455/517 |
| 2008/0025208 A1* | 1/2008 | Chan | 370/217 |
| 2008/0062984 A1* | 3/2008 | Emeott et al. | 370/392 |
| 2008/0130492 A1* | 6/2008 | Kuo | 370/226 |
| 2008/0144507 A1* | 6/2008 | Tseng | 370/235 |
| 2008/0144593 A1* | 6/2008 | Tseng | 370/342 |
| 2008/0159457 A1* | 7/2008 | Nelson | 375/356 |
| 2008/0200197 A1* | 8/2008 | Gessner et al. | 455/517 |
| 2008/0253340 A1* | 10/2008 | Hirano et al. | 370/338 |
| 2008/0285526 A1* | 11/2008 | Gorokhov et al. | 370/338 |
| 2009/0034485 A1* | 2/2009 | Tseng | 370/335 |
| 2009/0210710 A1* | 8/2009 | Zheng et al. | 713/171 |
| 2009/0241104 A1* | 9/2009 | Amiga et al. | 717/174 |
| 2009/0316613 A1* | 12/2009 | Tseng | 370/310 |
| 2009/0325506 A1* | 12/2009 | Nibe | 455/67.13 |
| 2010/0265891 A1* | 10/2010 | Belcea | 370/328 |
| 2011/0188378 A1* | 8/2011 | Collins et al. | 370/236 |

FOREIGN PATENT DOCUMENTS

| | | |
|---|---|---|
| JP | 2000 32541 | 1/2000 |
| JP | 2002-152124 | 5/2002 |
| JP | 2003 259457 | 9/2003 |

OTHER PUBLICATIONS

Didier Bourse, et al. "The $E^2$ R II Flexible Spectrum Management (FSM) Framework and Cognitive Pilot Channel (CPC) Concept-Technical and Business Analysis and Recommendations", Section 5, End to End Reconfigurability II ($E^2$R II) White Paper, Nov. 2007, first page (abstract) and pp. 26-43.

International Search Report issued Sep. 15, 2009 in PCT/JP09/64270 filed Aug. 12, 2009.

Perez-Romero, Jordi et al., "A Novel On-Demand Cognitive Pilot Channel enabling Dynamic Spectrum Allocation", IEEE, pp. 46-54, (Apr. 2007).

Martigne, Patricia et al., "An alternative concept to scanning process for cognitive radio systems: technical and regulatory issues", $16^{th}$ 1st Mobile and Wireless Communications Summit. pp. 1-5, (Jul. 2007).

* cited by examiner

DISTRIBUTION APPARATUS, TERMINAL APPARATUS, SYSTEM, AND METHOD

BACKGROUND OF THE INVENTION

1. Field of the Invention

The present invention generally relates to radio communications systems and specifically relates to distribution apparatuses, terminal apparatuses, systems, and methods.

2. Description of the Related Art

Wide bandwidths are necessary for conducting communications at high speed. However, it is difficult to secure wide frequency bandwidths which are common throughout the world since various radio communications systems are in operation. Thus, a technique is being studied in which are used multiple frequency bandwidths, each of which is provided with a frequency utilization priority, and in which multiple radio communications systems use the same frequency bandwidth according to the priority. Moreover, it is difficult to secure a frequency bandwidth which can be used in common throughout the world, so that it is necessary to select, at each country, one from multiple candidates. Thus, a terminal apparatus needs to have, in accordance with a region used in, a unit which identifies a radio communications system which is in operation at a region to which the terminal apparatus belongs. However, with a large number of ultra wideband radio communications systems in use, a large consumption power and/or a long identification time is needed to realize a function which identifies a radio bandwidth which can be used. Moreover, in an environment in which frequencies are shared for use, a low-priority radio communications system (below called an "additional system") conducts communications while using the same frequency bandwidth such as to ensure that interference is not caused on a high-priority communications system (below-called a "priority system"). Such a technique includes a technique which calculates and identifies an interference amount caused on the priority system using a propagation loss between the priority system and the additional system, and a technique which controls a transmission power of the additional system according to the interference amount identified. Moreover, a traffic amount at a time of communications by the priority system may be taken into account to calculate an allowable interference amount and to control the transmission power of the additional system. For example, the additional system may be controlled such that, in a time zone with a small traffic of the priority system, the allowable interference amount is increased, so that it is operated with a maximum transmission power which is larger than that in a time zone with a large traffic of the priority system.

When using such a technique, a frequency utilization method is dynamically changed, so that the terminal apparatus must always utilize a function which identifies a radio communications system and a frequency bandwidth which can be used.

Thus, as a way to respond to a dynamic change of the frequency utilization method, a cognitive pilot channel (CPC) is being proposed which distributes, to all of the radio communications systems in operation in each of regions, information such as frequency and radio technology used within each of the regions. The cognitive pilot channel may be applied to eliminate a process of scanning basic parameter information of a radio communications system to which a terminal apparatus can connect to. Moreover, by applying the cognitive pilot channel, changing some of parameters of a radio communications system is made possible by changing such control information as described above. Furthermore, the cognitive pilot channel may be applied without changing the terminal apparatus itself.

Therefore, adopting the present technique makes it possible to decrease the price of the terminal apparatus and to deal with changing of the radio communications system parameters. Moreover, as dealing with changing the radio communications system parameter is made possible, it is possible to expect an increase in frequency utilization efficiency.

In the present technique, an area covered by a base station apparatus is divided into multiple portions, each of which may also be called a mesh. In the area covered by the base station, a control signal is transmitted, and then, radio resource utilization methods such as radio communications system basic parameter information are reported multiple times mesh by mesh. Information reported may be the same. Moreover, as a method of distributing a control signal, there are two types, a broadcast-type distribution method and an on-demand type distribution method. In the broadcast-type distribution method, the base station apparatus periodically distributes control information corresponding to the mesh within a region which the base station apparatus is in charge of. In the on-demand type distribution method, the base station apparatus distributes control information for the mesh requested by the terminal apparatus in response to a request for distribution from a terminal apparatus. Moreover, a Hierarchical Advertiser CPC is being proposed in which some control signals to be distributed are divided and multiple distribution stations and units are utilized.

Non-Patent Document 1:
J. Perez-Romero, et al., "A Novel On-Demand Cognitive Pilot Channel enabling Dynamic Spectrum Allocation," IEEE Dyspan 2007.

SUMMARY OF THE INVENTION

Problems to be Solved by the Invention

A distribution apparatus distributes information corresponding to an individual mesh, or a mesh unit into which an area covered by the distribution apparatus is divided. Thus, in many cases, in a mesh in proximity to a mesh to which information is distributed, it is expected that, in operation, similar radio systems and radio parameters are used. However, as mesh locations are different, distribution of information sets must be made as if they are different information sets even when the same information sets are to be distributed between meshes using the same radio system and radio parameter, which became a factor in significantly decreasing frequency utilization efficiency.

Thus, the present distribution apparatus, terminal apparatus, system, and method are realized for solving the above-described problems, which object is to simultaneously distribute system information to terminal apparatuses which belong to multiple regions having the same system information.

Means for Solving the Problem

In order to solve the problem as described above, the present distribution apparatus is a distribution apparatus which distributes to multiple regions, one or multiple radio communications systems being usable in each of the regions, the distribution apparatus including:

a storage unit which stores each of the radio communications systems usable for each of the regions;

a selecting unit which selects, out of the multiple regions to which the distribution apparatus distributes, first regions in which a radio communications system in operation is the same; and a distribution unit which distributes, based on each of the radio communications system usable for each of the regions that is stored in the storage unit, all or some of information on the radio communications system for each of the first regions selected by the selecting unit.

The present terminal apparatus is a terminal apparatus which receives control information distributed by a distribution apparatus, wherein the distribution apparatus distributes all or some of information on a radio communications system or information on a radio parameter for each of first regions in which the radio communications system in operation is the same or for each of second regions in which the radio parameter is the same out of multiple regions to distribute to, and wherein the terminal apparatus includes a receiver which receives the information on the radio communications system or the information on the radio parameter that is transmitted from the distribution apparatus;

a determining unit which determines a radio communications system to connect to, based on the information on the radio communications system or the information on the radio parameter that is received by the receiver; and a connecting unit which connects to the radio communications system determined by the determining unit.

The present system is a system including a distribution apparatus which distributes to multiple regions and a terminal apparatus which receives control information distributed by the distribution apparatus, one or multiple radio communications systems being usable in each of the regions, the distribution apparatus including:

a storage unit which stores each of the radio communications systems usable for each of the regions;

a selecting unit which selects, out of the multiple regions to which the distribution apparatus distributes, first regions in which a radio communications system in operation is the same or second regions in which a radio parameter is the same;

a distribution unit which distributes, based on each of the radio communications systems usable that is stored in the storage unit, all or some of information on the radio communications system or information on the radio parameter for each of the first regions or the second regions which are selected by the selecting unit, and wherein the terminal apparatus includes a receiver which receives information on a radio communications system or information on a radio parameter that is transmitted from the distribution apparatus;

a determining unit which determines a radio communications system to connect to, based on information on a radio communications system or information on a radio parameter that is received by the receiver; and a connecting unit which connects to the radio communications system determined by the determining unit.

The present method is a method in a system including a distribution apparatus which distributes to multiple regions and a terminal apparatus which receives control information distributed by the distribution apparatus, one or multiple radio communications systems being usable in each of the regions, the distribution apparatus including:

a selecting step of selecting, out of the multiple regions to which the distribution apparatus distributes, first regions in which a radio communications system in operation is the same or second regions in which a radio parameter is the same;

a distribution step of distributing, based on each of the radio communications systems usable that is stored in the storage unit, all or some of information on the radio communications system or information on the radio parameter for each of the first regions or the second regions which are selected by the selecting step, and the terminal apparatus including:

a receiving step which receives information on a radio communications system or information on a radio parameter that is transmitted from the distribution apparatus;

a determining step which determines a radio communications system to connect to, based on information on a radio communications system or information on a radio parameter that is received by the receiving step; and a connecting step which connects to the radio communications system determined by the determining step.

Advantage of the Invention

The disclosed distribution apparatus, terminal apparatus, system, and method make it possible to simultaneously distribute to terminal apparatuses which belong to multiple regions with the same system information.

DESCRIPTION OF THE PREFERRED EMBODIMENTS

Figure 1:
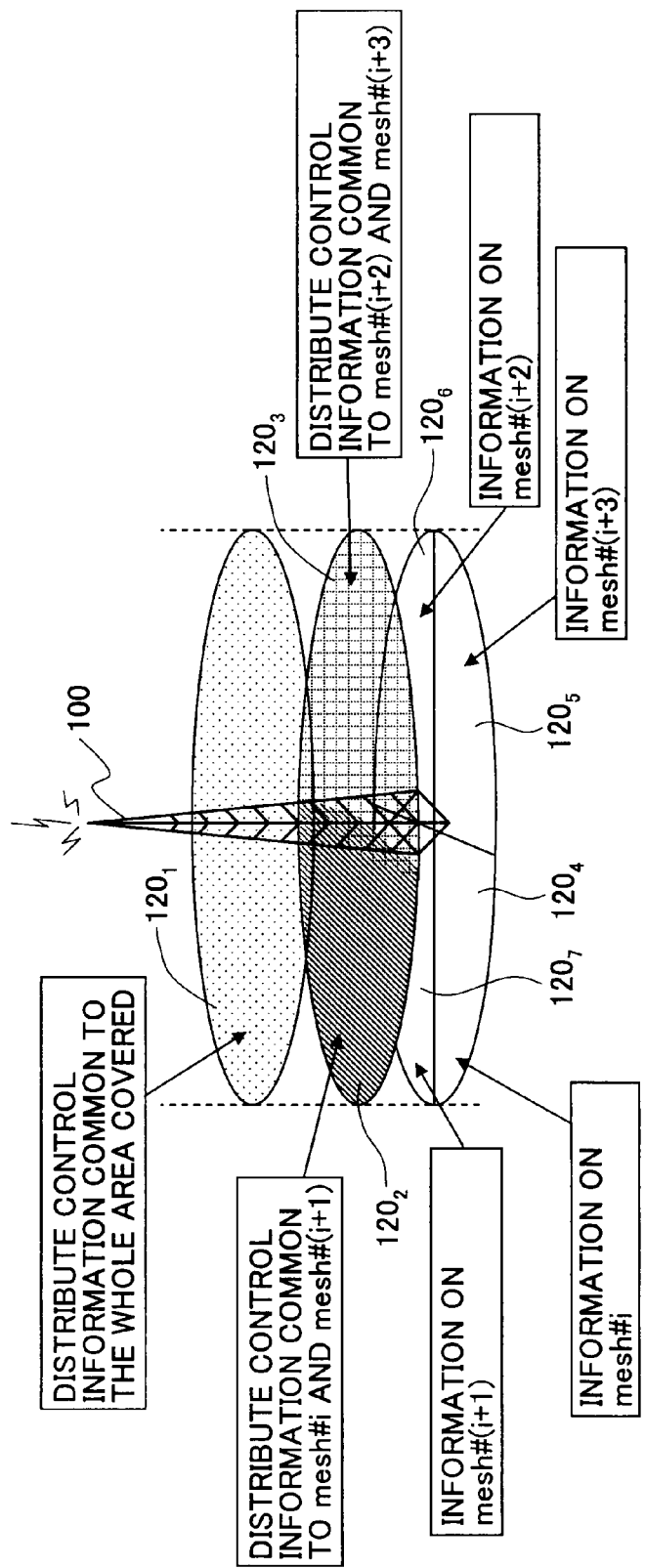
FIG. 1 is a conceptual diagram illustrating a hierarchization of distribution regions at a distribution station according to one embodiment.

[Description of Notations]
- 100 distribution apparatus
- 120 ($120_1$-$120_7$) distribution region
- 101 timer
- 102 distribution mesh information storage unit
- 103 distribution control unit
- 104 information distribution unit
- 105 distribution scheduler
- 106 request signal receiver
- 107 request signal analyzing unit
- 400 terminal apparatus
- 401 distribution information receive processing unit
- 402 control information determining unit
- 403 distribution station information processing unit
- 404 mesh configuration information processing unit
- 405 mesh information processing unit
- 406 distribution station information storage unit
- 407 mesh configuration information storage unit
- 408 mesh information storage unit
- 409 mesh information acquisition control unit
- 410 terminal location information acquisition unit
- 411 connecting radio system receive processing unit
- 412 connecting radio system control unit
- 413 request information transmitter

BEST MODE OF CARRYING OUT THE INVENTION

With reference to the drawings, a description is given below with regard to embodiments of the present invention. Throughout the drawings for explaining the embodiments, same letters are used for those having the same functions, so that repetitive explanations are omitted.

A distribution station (distribution apparatus) according to the present embodiments is used for multiple regions. In each of the regions, one or multiple radio communications systems are in operation. In each of the regions, system information required for connecting to the one or multiple radio communications systems is distributed to a terminal apparatus in a common control signal. The common control signal may be distributed in wireless or in wire line. Moreover, the distribution station may be included in a base station.

The distribution station stores system information required for connecting to the radio communications systems within the region to which the distribution station belongs, region information on the region to distribute to, and hierarchized region information in which regions having the same system information is set as one hierarchized region. Moreover, the distribution station controls distribution of the system information, the region information, and the hierarchical region information. Furthermore, the distribution station distributes information according to the control.

A distribution station which adopts the broadcast-type distribution, details of which are described below, may be arranged, for example, to include a timer which conducts time management for periodically distributing region information to be distributed, and a distribution scheduler which selects information to be distributed in synchronization with the timer.

Moreover, a distribution station which adopts the on-demand type distribution, details of which are described below, may be arranged, for example, to include a request signal receiver which receives a request signal from the terminal apparatus belonging to the region which belongs thereto and an analyzing unit which analyzes, from the received request signal, the region to which belongs the terminal apparatus requesting distribution.

Furthermore, it may be arranged, for example, to include all of the above-described units when both the broadcast-type distribution and the on-demand type distribution are adopted.

System

A network in which the distribution station according to the present embodiment is applied is described.

The distribution station according to the present embodiment is used for the multiple regions. In other words, a common control signal is distributed to the multiple regions. In each of the regions, one or multiple radio communications systems are in operation. In each of the regions, system information required for connecting to the one or multiple radio communications systems is distributed to the terminal apparatus in the common control signal. The distribution station includes information on radio communications systems in operation within a region to which the distribution station belongs (a region covered by the distribution station), which information is required for connecting to the radio communications systems in operation within the region. Here, it may be arranged for the region to correspond to one mesh. Moreover, information on systems (below called system information or a control signal) may include information on frequency used by each of the radio communications systems, a radio access scheme, charging information, which is information on an operator in operation, etc. Moreover, the information on the frequency may include center frequency and bandwidth information. Furthermore, the radio access scheme may include radio access technology (RAT) information.

Neighboring regions are likely to resemble each other in their operating environments, so that many regions are expected to be in operation using the same radio communications system or radio parameter. A collection of multiple regions which use the same radio communications system or radio parameter is defined as one upper-level hierarchical region. Below, the upper-level hierarchical region is called an upper-level region. Moreover, a region which belongs to the upper-level region is called lower-level regions below. An overview diagram of hierarchized meshes is shown in FIG. 1. According to FIG. 1, regions in which a distribution station 100 distributes are hierarchized. As an example, FIG. 1 shows a region in which control information common to the whole of an area covered by a distribution station 100 is distributed, a region in which control information common to a mesh #i and a mesh #(i+1) is distributed, a region in which control information common to a mesh #(i+2) and a mesh #(i+3) is distributed, and a region in which control information common to meshes #i–#(i+3) is distributed. For example, the region in which the control information common to the whole of the area covered by the distribution station 100 is distributed may be called a first hierarchy. Moreover, the area in which the control information common to the mesh #i and the mesh # (i+1) is distributed and the area in which the control information common to the mesh # (i+2) and the mesh # (i+3) may be called a second hierarchy. The area in which the control information common to the meshes #i–#i+3 is distributed may be called a third hierarchy. The mesh configuration is exemplary, so that it can be changed as needed depending on the commonality of system information to be distributed.

Similar to the distribution to the lower-level region, the distribution apparatus distributes information on a radio communications system or a radio parameter in operation in the upper-level region. The information on the radio communications system or the radio parameter to be distributed to the upper-level region includes only information sets which are the same out of information sets on the radio communications system or the radio parameter used in the lower-level regions which belong thereto. Moreover, the information on the radio communications system or the radio parameter to be distributed to the upper-level region may be arranged to include only some of the information sets which are the same out of the information sets on the radio communications system or the radio parameter used in the lower-level regions which belong to the upper-level region. In this case, the distribution apparatus distributes, to the lower-level regions, information other than the some of the information sets which are the same.

The distribution apparatus 100 according to the present embodiment holds and distributes hierarchical mesh configuration information which indicates information on the lower-level regions which belong to (are included in) the upper-level region. In addition, mesh configuration information is held and distributed which indicates a range to be the lower-level region or location information of the lower-level region.

Moreover, these information sets may be updated dynamically. This makes it possible to also deal with a dynamic change of a frequency utilization method due to change in traffic amount, etc. For example, the traffic varies depending on a distribution time zone, etc. Moreover, this makes it possible to achieve an increase in distribution information efficiency and is preferable also for improving frequency utilization efficiency.

Furthermore, it may be arranged for multiple upper-level hierarchies to be further belonged to an upper-level hierarchy. This makes it possible to achieve further increased distribution information efficiency when some or all of the same radio communications systems or radio parameters are used by the multiple upper level-hierarchies. This is to make sure that some or all of duplicate radio communication systems or radio parameters are not distributed.

A terminal apparatus according to the present embodiment determines a connecting radio communications system based on system information distributed from a distribution station. The terminal apparatus starts a synchronization process and a connection process according to a radio parameter of the connecting radio communications system.

Based on location information of the distribution station that is distributed from the distribution station, the terminal apparatus determines a region to which it belongs by making a comparison, therewith, of terminal location information acquired at the terminal apparatus.

The terminal apparatus acquires information on an upper-level region to which belongs a region to which the terminal apparatus belonged based on hierarchized mesh configuration information distributed from the distribution station. The terminal apparatus acquires information on a region to which belongs the terminal apparatus out of region information distributed from the distribution apparatus based on region location information and upper-level region information acquired.

For example, when some of the same information sets out of information sets on a radio communications system or a radio parameter used in a lower-level region which belong to an upper-level region are included in information on a radio communications system or a radio parameter that is distributed to the upper-level region by the distribution apparatus and information other than the some of the same information sets is distributed to the lower-level region, the terminal apparatus acquires some of the same information sets out of information on the radio communications system or the radio parameter used in the lower-level region included in the information on the radio communications system or the radio parameter that is distributed in a region to which the terminal apparatus belongs and acquires information other than the some of the same information sets from the information distributed to the lower-level region.

Distribution information transmitted by the distribution station according to the present embodiment is described.

Below, those elements particularly relevant to the present embodiment are emphasized, so that the other elements are omitted for brevity of illustration.

The distribution station 100 transmits a common control signal to a region (mesh) covered by the distribution station 100. In the region are included one or multiple radio communications systems. The distribution station 100 reports system information to be required for connecting to the radio communications system in operation in the region covered by the distribution station 100. The system information may be included in the common control signal.

Here, the information to be distributed may be divided for each distribution station. More specifically, the common control signal is divided for each distribution station. When the distribution station 100 reports the system information required for connecting to the radio communications system in operation in the region covered by the distribution station 100, a cognitive pilot channel (CPC) may be applied.

On the other hand, a region (an upper-level region) is defined which is a collection of multiple regions having system information which is the same as all or some of system information sets required for connecting to the radio communications system in operation in the region distributed. The distribution station 100 distributes a common control signal to be distributed to the upper-level region. This makes it possible to simultaneously distribute system information to multiple regions. The distribution station 100 distributes information on regions (lower-level regions) which belong to the upper-level region as hierarchized mesh configuration information.

In related-art CPCs, only a unit which distributes system information of a region which belongs to a distribution station is considered, but a unit which dynamically changes a configuration of regions which belong to the distribution station, and a unit which makes collective distribution when some or all of the system information sets are the same in regions which belong to the distribution station are not considered.

Distribution Information

Figure 2:
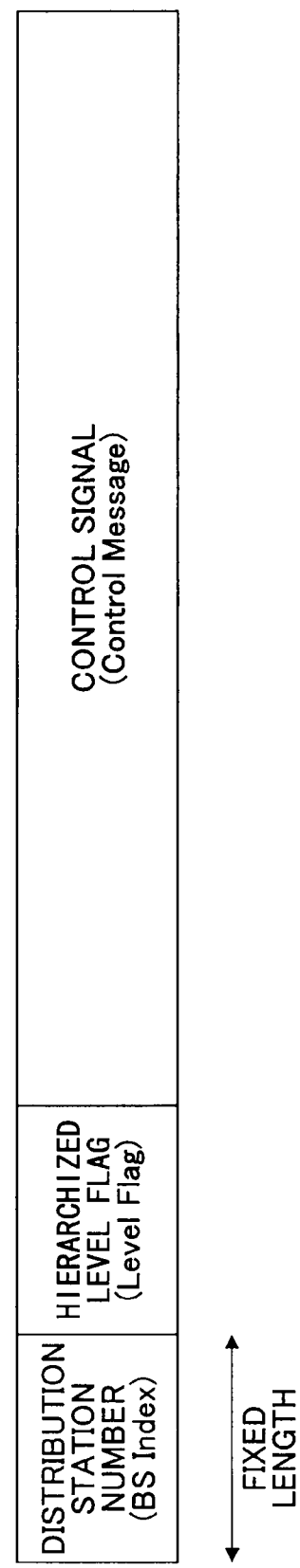
FIG. 2 is an explanatory diagram illustrating an exemplary control information signal distributed by the distribution station according to one embodiment.

An example of information to be distributed is described with reference to FIG. 2. A distribution format to be the basis is described.

The basic distribution format of the distribution information includes a distribution station number (BS index), a hierarchized level flag (level flag), and a control signal (control message). The distribution station number may be of a fixed length. The distribution station number is information which indicates a distribution station which distributes information. The hierarchized level flag indicates whether the information to be distributed is information related to a hierarchized region. A control signal includes distribution information which is made up of system information, information on a region distributed in, etc. For example, it may be arranged that bits which make up the distribution station number being all 1 indicates information of a distribution apparatus which distributes the information. Moreover, it may be arranged that the hierarchized level flag being 1 indicates information to be distributed to the upper-level region.

Figure 3:
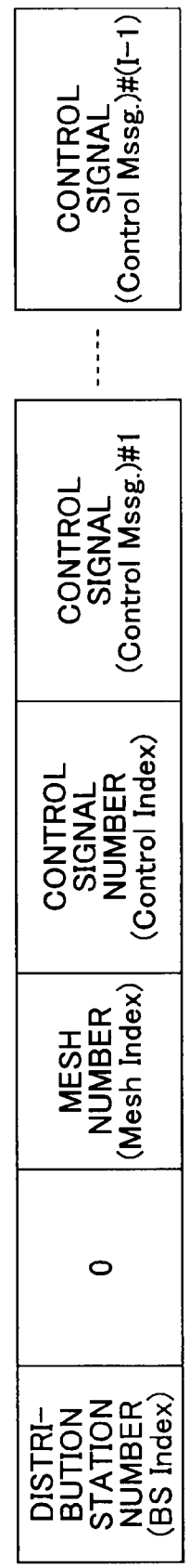
FIG. 3 is an explanatory diagram illustrating an exemplary mesh control information signal distributed by the distribution station according to one embodiment.

An example of a mesh control information signal is described with reference to FIG. 3.

In the mesh control information signal, information related to a radio communications system in operation in the lower-level region to distribute to is provided. The mesh control information signal includes a mesh number (Mesh index), a control signal number (Control index), and a control signal (Control Mssg).

For example, the mesh number, the control signal number, and the control signal may be included in a part of a control signal of a basic distribution format. In this case, the distribution station number may include a number (a distribution station number) of a distribution station (CPC-BS). Moreover, a hierarchized level flag may include 0 (zero). The zero may indicate information for a mesh unit. The mesh number is information indicating a lower-level region to distribute to. The control signal number is information indicating a type of multiple information sets to be distributed to a region to distribute to that is included in distribution information. It may be an amount of control information relative to information to be distributed. For example, the amount of control information may include linker information which indicates a head bit of each control signal (control mssg.) and the number of control signals (the number of control "mssg."s). The linker may include information such as bit number location.

The control signal (control mssg.) to be distributed that is included in the mesh control information signal includes each control signal required for connecting in a lower-level region to which a terminal apparatus belongs. For example, each control signal includes information on operator used. The information on operator used may include a name of operator used, information on frequency used, information on RAT used, and maximum transmission power information. Here, the information on the frequency used may include multiple frequency information sets, e.g., frequency information sets 1 and 2. Moreover, the information on the RAT used may include multiple RAT information sets. The RAT information sets may include synchronization signal information. Moreover, the maximum transmission power information may include multiple maximum transmission power information sets. Multiple information sets on the operator used may be included.

Normal CPC distribution information includes such information for connection. The information for the connection includes information for retrieving an operator which can be connected to, information for retrieving the RAT which can be connected to, and a maximum power at which transmission and reception are possible.

Figure 4:
FIG. 4 is an explanatory diagram illustrating an exemplary mesh configuration information signal distributed by the distribution station according to one embodiment.

An example of a mesh configuration information signal is explained with reference to FIG. 4.

The mesh configuration information signal includes, for all the regions covered by the distribution station, location information on the lower-level region, and information on the range of the lower-level region. A mesh number (mesh index) of the mesh configuration information signal may be all 1's. Then, for this reason, it is preferable that the number of bits of the mesh number included in the mesh control information signal and the number of bits of the mesh number specified by the mesh configuration information signal are the same.

The mesh configuration information includes the number of meshes (No. Mesh) to be meshes (lower-level regions), which are to be regions to distribute to by the distribution station, and mesh information (Mesh Mssg.) on a mesh to distribute to. For example, the number of meshes and the mesh information may be included in a control information portion of a basic distribution format. In this case, the BS index may include a number of the distribution station which distributes. Moreover, for information of a mesh to which the distribution station belongs, the hierarchized level flag may include zero. The zero may indicate information on a lower-level region. The mesh number may be all 1's. It may be arranged that specifying to all 1's indicates information related to mesh configuration within an area covered by the distribution station.

The number of meshes is the number of lower-level regions covered by the distribution station out of one or more regions distributed to by the distribution station 100. The mesh information is location information of each mesh (lower-level region) to be distributed to by the distribution station or information on a range of the regions. For example, an applicable mesh number, a mesh location, a mesh coverage range (e.g., a radius of 100 m, etc.), mesh distribution method information (broadcast-type distribution or on-demand type distribution, and a combination-type distribution of broadcast-type and on-demand type distributions) may be included therein. The mesh distribution method information may be arranged to be an option. This mesh distribution method may be arranged to be specified when the distribution method differs from mesh to mesh. The location information may include information in which a center coordinate of the lower-level region is expressed in latitude and longitude. Information on a range of a region may include information indicating a radius from the center coordinate of the lower-level region.

Figure 5:
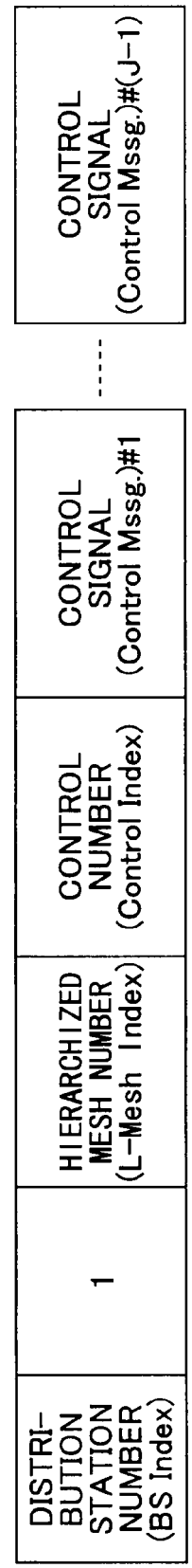
FIG. 5 is an explanatory diagram illustrating an exemplary hierarchized mesh control information signal distributed by the distribution station according to one embodiment.

An example of a hierarchized mesh control information signal is explained with reference to FIG. 5.

The hierarchized mesh control information signal includes system information to be distributed to a hierarchized mesh (an upper-level region) to which each region belongs. The hierarchized mesh control information signal is used when, to the upper-level region to which each region belongs, the same system information (radio communications system and radio parameter information) of multiple regions which belongs thereto is distributed.

The hierarchized mesh control information includes a hierarchized mesh number (L-Mesh Index), a control signal number (Control Index), and a control signal (Control Mssg). For example, the hierarchized mesh number, the control number, and the control signal may be included in a part of a control signal of a basic distribution format. In this case, a distribution station number may include a number of a distribution station which distributes. Moreover, a hierarchized level flag may include 1 (one). The one may indicate that hierarchizing information is to be distributed. The hierarchized mesh number may include a number of an upper-level region to distribute to. The control number, which is information indicating a control signal to distribute to an upper-level region, may include control information amount and type information of information to be distributed. For example, it may include the number of control information, and a linker to each control information. The linker may be a bit number location, etc.

The control information may include some or all of system information sets which are the same in regions which belong to an upper-level region. For example, each control signal includes information on operator used. The information on the operator used may include a name of the operator used, information on frequency used, information on RAT used, and maximum transmission power information. Here, the information on the frequency used may include, multiple frequency information sets, e.g., frequency information sets 1 and 2. Moreover, the information on the RAT used may include multiple RAT information sets. The RAT information sets may include synchronization signal information. Moreover, the maximum transmission power information may include multiple maximum transmission power information sets.

Each of the control information sets may include multiple information sets on operator used.

On the other hand, information on distribution by a normal distribution station such as CPC is the same as mesh control information. The applicable hierarchized mesh control signal includes control information to be distributed to an upper-level region.

The hierarchized mesh number may have different number of bits relative to the mesh number. The control number and the control signal may be distributed in the mesh control information. It is desirable that they are similar to distribution control information included in the control number and the control signal.

Figure 6:
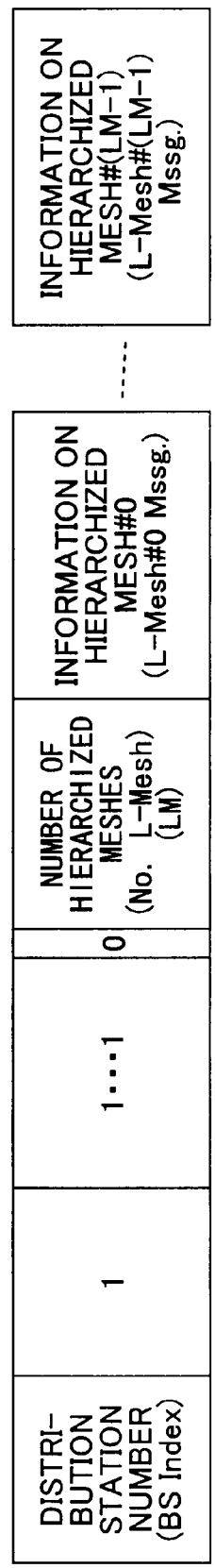
FIG. 6 is an explanatory diagram illustrating an exemplary hierarchized mesh configuration information signal distributed by the distribution station according to one embodiment.

An example of a hierarchized mesh control information is explained with reference to FIG. 6.

The hierarchized mesh configuration information signal indicates information of an upper-level region to which each region belongs. A hierarchized mesh number (L-Mesh Index) included in the hierarchized mesh control information signal may be set as all 1's. The hierarchized mesh number may be specified to 1 to indicate that it is information related to a hierarchized mesh configuration within a range covered by the distribution station.

The hierarchized mesh configuration information signal includes a hierarchized level mesh (Level Mesh), the number (No. L-Mesh (LM)) of upper-level regions (hierarchized meshes) used within a range covered by the distribution station, and information on i-th hierarchized mesh (L-Mesh #i Mssg). For example, information on the hierarchized level mesh, the number of hierarchized meshes, and the lower-level hierarchized mesh may be included in a portion of a control message of a basic distribution format. In this case, a distribution station number may include a number of a distribution station which distributes. Moreover, a hierarchized level flag may include 1 (one). The one may indicate that hierarchizing information is to be distributed. The hierarchized mesh number (L-Mesh index) may be set to all 1's. It may be arranged that all 1's indicate information on hierarchized configuration within an area covered by the distribution station. The hierarchized level mesh may be specified to 0 (zero). The 0 (zero) may indicate that a mesh is to be hierarchized. The number of hierarchized meshes may be not the actual number of regions, but the number of upper-level regions (hierarchized meshes) to which distribution is made collectively to lower-level regions (meshes) and upper-level regions (hierarchized meshes) having the same system information at the time of distribution. The information on hierarchized meshes may include the number of regions which belong to the upper-level region, a mesh number corresponding to the lower-level region, and a hierarchized mesh number corresponding to an upper-level region which belongs to an upper-level region. For example, the mesh number (Mesh Index) and hierarchized mesh number (L-Mesh Index) may be included.

The number of hierarchized meshes is, for one or multiple regions in which the distribution station distributes, the number of upper-level regions which belong to the distribution station. The hierarchized mesh information is information on multiple regions which belong to the upper-level region. For example, a mesh number of the upper-level region or the lower-level region which belongs to the upper-level region, hierarchized mesh distribution method information (broadcast-type distribution or on-demand type distribution, or broadcast-type and on-demand type distributions combined-type distribution) may be included. It may be arranged for the hierarchized mesh distribution method to be an option. The hierarchized mesh distribution method may be specified such that a distribution method differs from an upper-level region to another.

Figure 7:
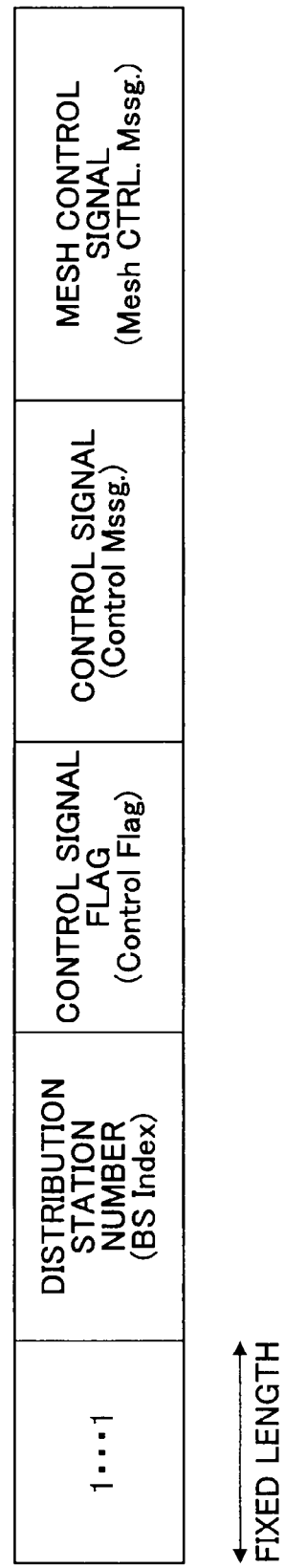
FIG. 7 is an explanatory diagram illustrating an exemplary distribution station configuration information signal distributed by the distribution station according to one embodiment.

An example of distribution station configuration information is explained with reference to FIG. 7.

The distribution information includes a distribution station number (BS Index), information indicating information to be distributed (Control Flag), a control signal (Control Mssg), and a mesh control signal (Mesh CTRL Mssg). Bits which indicate a distribution station number (BS Index) at the head of a basic format at the time of distribution may be 1 . . . 1 (all 1's), for example. This indicates that it is distribution station configuration information. The distribution station number (BS Index) is information indicating a station which distributes. It may be a number of a distribution station, which is the station which distributes. The control flag is a flag indicating information which is distributed by control information (Control Mssg.) of a distribution station which distributes. The control signal (Control Mssg.) includes the distribution station information (information indicating criteria for determining whether a terminal belongs thereto) and information indicating a distribution method (broadcast-type/on-demand type/combined type) at the time the distribution station distributes other distribution information. The control signal may include information on a distribution method used by the distribution station and a location of the distribution station. The distribution station information may include distribution location information, a coverage range of the distribution station (for example, a radius of 1000 m, etc.), and an operator name of the distribution station. The operator name of the distribution station may be an option. When a coverage range and location information of the distribution station are added, if a difference (a distance) between location information of the distribution station and location information of the terminal apparatus are larger than a coverage range of the distribution station, distribution station configuration information of a different distribution station may be received to search for a distribution station to which it belongs. At this time, a GPS of the terminal apparatus may be used. The mesh control signal includes information required to receive hierarchized mesh control information, hierarchized mesh configuration information, mesh configuration information, mesh control information, and mesh configuration information distributed. For example, information is included on the number of bits used for a hierarchized mesh number (L-Mesh Index), and the number of bits used for a mesh number (Mesh Index).

With respect to information indicating broadcast-type/on-demand type/combined type distribution methods, an uplink access parameter may be included when it is the on-demand type/combined type distribution method. The access parameter may include a frequency, a radio RAT, a band, and radio technology information.

(Method of Calculating from a Location of the Terminal Apparatus a Mesh (Lower-Level Region) to which it Belongs)

(1) A distribution station reports to a terminal a mesh (lower-level region) center location in a mesh configuration information signal. The center location of the mesh may include, for example, latitude information, longitude information, etc.

(2) The terminal apparatus calculates error information based on mesh center location information included in a mesh configuration information signal distributed from a distribution station to which the apparatus belongs and location information of the terminal apparatus. For example, it may be calculated as error information=(location information detected by the terminal apparatus−reported mesh center location)$^2$.

(3) For the terminal apparatus, a mesh which is closest to the terminal apparatus (mesh with information on error which is the smallest) is arranged to be a mesh to which it belongs. For example, based on the error information determined in (2), a mesh corresponding to a mesh center location when the error is small is arranged to be a mesh to which it belongs.

This method is suitable for broadcast-type. It may also be applied to on-demand and combined types.

(Different Method of Calculating, from a Location of the Terminal Apparatus, a Mesh it Belongs to)

(1) Using an uplink circuit to a distribution apparatus to which a terminal apparatus belongs, the terminal apparatus transmits location information acquired by the terminal apparatus to the distribution apparatus.

(2) Based on the received location information of the terminal, the distribution apparatus calculates a number of a mesh it belongs to.

(3) Based on the calculated mesh number, the distribution apparatus distributes, to the terminal apparatus, information on the mesh to which it belongs.

This method is suitable for the on-demand type and the combined type.

(Method for Terminal Apparatus to Calculate Upper-Level Region)

(1) In a hierarchized mesh configuration information signal, the distribution station distributes a mesh number of all regions which belong to an upper-level region, and a corresponding mesh number.

(2) The terminal apparatus compares the mesh number of a region belonging to an upper-level region which corresponds to a hierarchized mesh number included in the hierarchized mesh configuration information signal and a mesh number of the terminal apparatus and stores, as an upper-level region, a hierarchized mesh number of a upper-level region that is to be the same mesh number.

(Distribution Apparatus (1))

Figure 8:
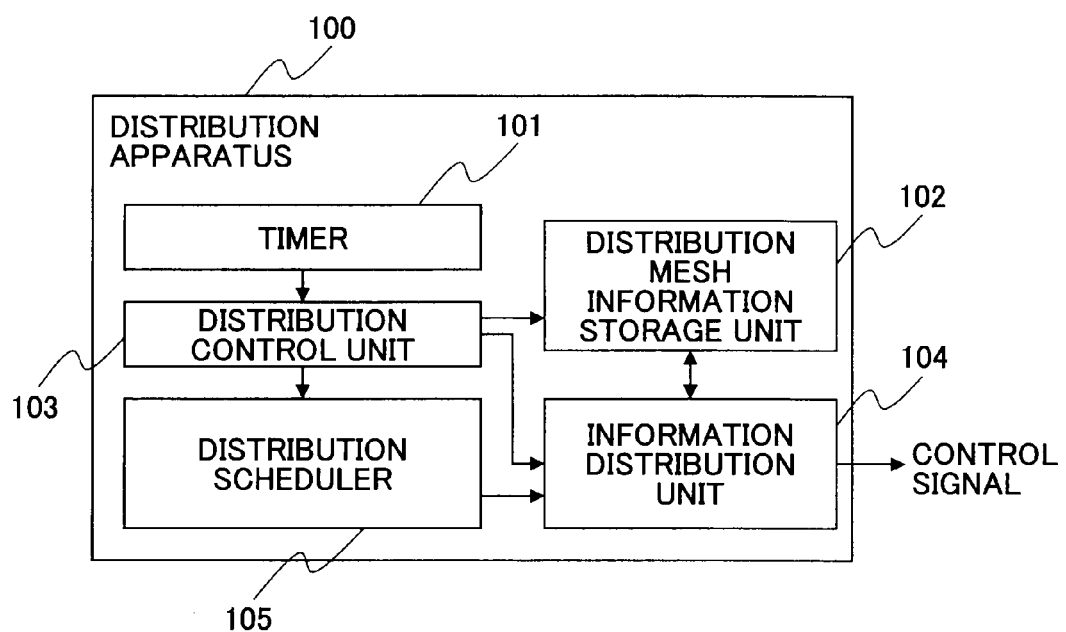
FIG. 8 is a first part of a functional block diagram illustrating a distribution apparatus according to one embodiment.

The distribution apparatus applied to the radio communications system as described above is explained with reference to FIG. 8.

For a distribution apparatus 100 according to the present embodiment, when a common control signal is to be distributed, a broadcast-type distribution is applied which conducts periodical distribution.

The distribution apparatus 100 according to the present embodiment includes a timer 101, a distribution mesh number storage unit 102, a distribution control unit 103, an information distribution unit 104, and a distribution scheduler 105.

The distribution mesh information storage unit 102 stores common control information to be distributed. The distribution mesh information storage unit 102 passes, to the information distribution unit 104, common control information for a region to distribute to. The distribution control unit 103 conducts control on distribution in the distribution apparatus 100. Based on time information periodically sent from the timer 101, the distribution control unit 103 conveys, to the information distribution unit 104, a mesh number of a region that is to be distributed to the distribution scheduler 105, and conveys, to the information distribution unit 104, when the information to be distributed is mesh configuration information, the mesh configuration information, conveys, to the information distribution unit 104, when the information to be distributed is hierarchized mesh configuration information, the hierarchized mesh configuration information, or conveys, to the information distribution unit 104, when the information to be distributed is hierarchized mesh control information, a number of a lower-level mesh. In addition, the distribution control unit 103 conveys, to the information distribution unit 104, information indicating that information which is distributed from the distribution scheduler 105 is to be reported. The information distribution unit 104 conveys, to the distribution mesh information storage unit 102, a distribution information type reported from the distribution scheduler 105, and receives, from the distribution mesh information storage unit 102, bit information of information to be distributed. The information distribution unit 104 distributes according to a predetermined radio technique. The distribution scheduler 105 selects a signal type to be distributed based on a distribution timing from the distribution control unit 103

The distribution control unit 103 which is included in the distribution unit 100 according to the present embodiments may include a function of an operating mesh configuration or hierarchized mesh configuration based on time information obtained from the timer 101. If a change of the mesh configuration or the hierarchized mesh configuration becomes necessary, the distribution control unit 103 reports information on the configuration to be changed to the distribution mesh information storage unit 102. Based on the reported information, the distribution mesh information storage unit 102 organizes distribution control information corresponding to the distribution information type.

(Terminal Apparatus (1))

Figure 9:
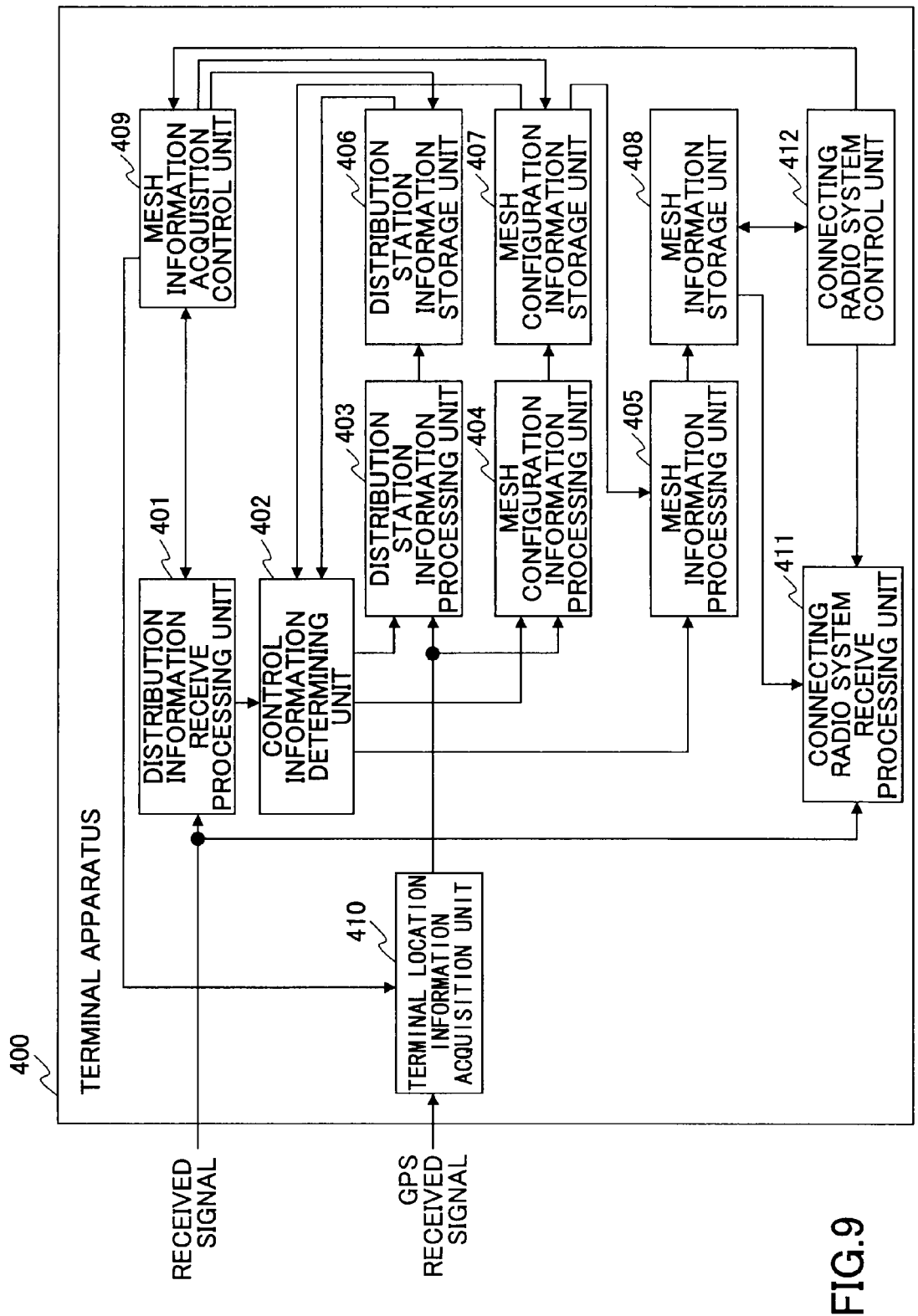
FIG. 9 is a first part of a functional block diagram illustrating a terminal apparatus according to one embodiment.

A terminal apparatus 400 according to the present embodiment is explained with reference to FIG. 9. The terminal apparatus 400 acquires information distributed from the distribution apparatus 100. The terminal apparatus 400 receives a common control signal periodically distributed by the distribution apparatus 100. Then, the terminal apparatus 400 acquires information on a region the terminal apparatus 400 belongs to.

The terminal apparatus 400 includes a distribution information receive processing unit 401, a control information determining unit 402, a distribution station information processing unit 403, a mesh configuration information processing unit 404, a mesh information processing unit 405, a distribution information storage unit 406, a mesh configuration information storage unit 407, a mesh information storage unit 408, a mesh information acquisition control unit 409, a terminal location information acquisition unit 410, a connecting radio system receive processing unit 411, and a connecting radio system control unit 412.

The distribution information receive processing unit 401 performs a process of receiving a common control signal distributed and a process of returning it to bit information. The distribution information receive processing unit 401 reports, to the control information determining unit 402, a signal which underwent the receive process and the process of returning to the bit information. The control information determining unit 402 determines the type of information distributed from bit information which underwent the receive process. The control information determining unit 402 reports information provided in bit information to the distribution station information processing unit 403 if the type is information on the distribution station, to the mesh configuration information processing unit 404 if the type is information on a mesh configuration or a hierarchized mesh configuration, and to the mesh information processing unit 405 if the type is information on mesh information or hierarchized mesh information.

The distribution information processing unit 403 receives information determined at the control information determining unit 402 as information on the distribution station, and compares it with location information of the terminal apparatus that is received from the terminal location information acquiring unit 410 to determine a distribution station to which the terminal apparatus belongs. In addition to the presence/absence of a distribution station to which it belongs, for the distribution station to which it belongs, the distribution station information processing unit 403 processes items other than information on a range and location information of distribution station that is included in information on the distribution station. It may also be arranged that, for the information of the distribution station to which the terminal apparatus 400 does not belong, the distribution station information processing unit 403 adds, to the information, information that the terminal apparatus 400 does not belong to and reports the information, and reports the added information to the distribution station information storage unit 406 and that the distribution station information storage unit 406 holds information reported.

The mesh configuration information processing unit 404 receives information determined at the control information determining unit 402 as mesh configuration information or hierarchized mesh configuration information, and compares it with location information of the terminal apparatus that is received from the terminal location information acquiring unit 410 to determine a distribution station to which the terminal apparatus belongs. The determined belonging region and upper-level region information is reported to the mesh configuration information storage unit 407, and the mesh configuration information storage unit 407 holds information reported. It may also be arranged that, for the information of the hierarchized region to which the terminal apparatus does not belong or of the region to which the terminal apparatus does not belong, the mesh configuration information processing unit 404 adds, to the information, information that the terminal apparatus does not belong and reports the added information to the mesh configuration information storage unit 407 and that the mesh configuration information storage unit 407 holds information reported.

The mesh information processing unit 405 receives information determined at the control information determining unit 402 as mesh information or hierarchized mesh information, compares it with mesh configuration information or hierarchized mesh configuration information received from the mesh configuration information storage unit 407, and determines information on a region to which the terminal apparatus belongs. System information on the determined upper-level region and region to which it belongs is determined, and the system information on the upper-level region and the region to which it belongs is reported to the mesh information storage unit 408. It may also be arranged that, for the information of the hierarchized region to which the terminal apparatus does not belong or of the region to which the terminal apparatus does not belong, the mesh information processing unit 405 adds, to the information, that the terminal apparatus does not belong thereto and reports the added information to the mesh information storage unit 408 and that the mesh information configuration storage unit 408 holds information reported.

The mesh information storage unit 408 receives, from the connecting radio system control unit 412, a request signal for system information of a radio system to connect to, and reports relevant system information to the connecting radio system information processing unit 411 and the connecting radio system control unit 412.

In response to a received report of a common control signal which is received from the distribution information receive processing unit 401, the mesh information acquisition control unit 409 causes the control information determining unit 402 to report, to the distribution station information storage unit 406, information on a distribution station it belongs to and to report, to the mesh configuration information storage unit 407, information on configuration of a mesh it belongs to. Moreover, a reporting is made such that it causes the terminal location information acquisition unit 410 to output the location information of the terminal apparatus.

(Distribution Apparatus (2))

Figure 10:
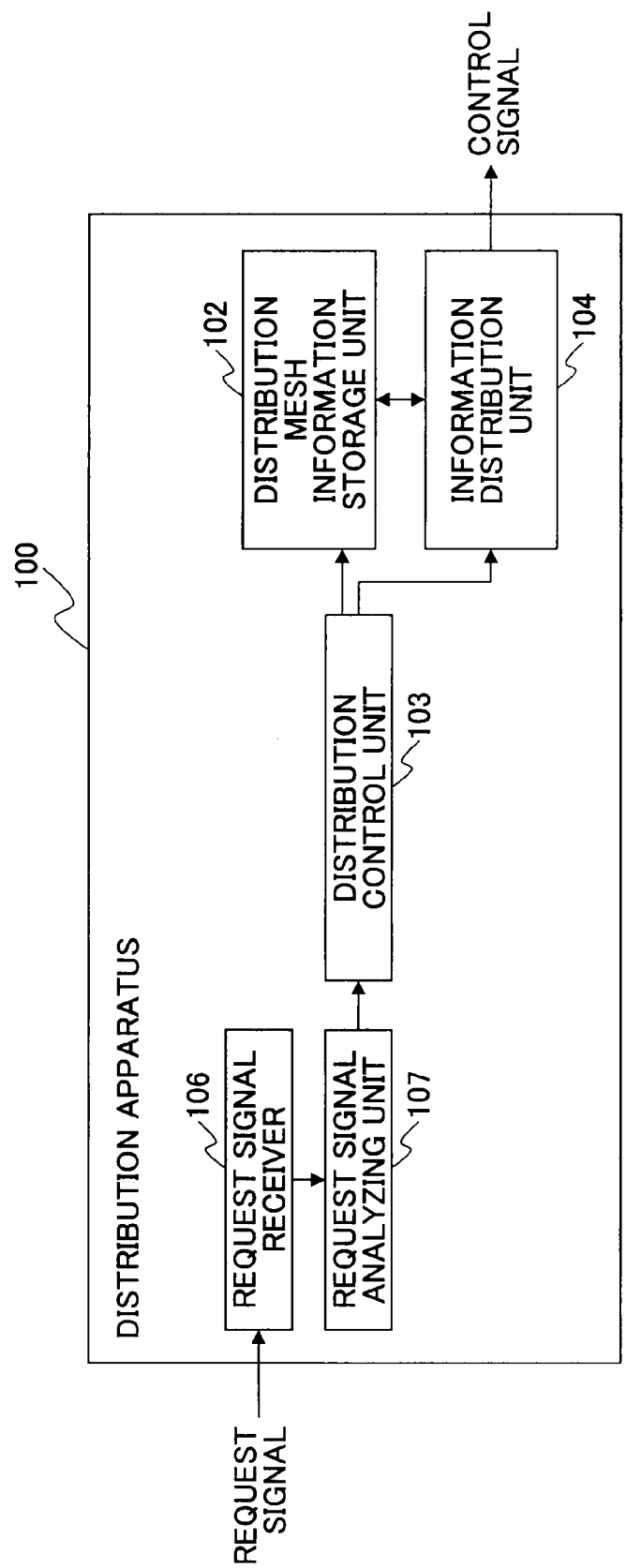
FIG. 10 is a second part of the functional block diagram illustrating the distribution apparatus according to one embodiment.

A different distribution apparatus applied to the above-described radio communications system is explained with reference to FIG. 10.

For a distribution apparatus 100 according to the present embodiment, an on-demand type distribution is applied which distributes in response to a request from a terminal apparatus 400 when distributing a common control signal.

The distribution apparatus 100 includes a distribution mesh information storage unit 102, a distribution control unit 103, an information distribution unit 104, a request signal receiver 106, and a request signal analyzing unit 107.

The request signal receiver 106 receives a request signal transmitted from the terminal apparatus 400 and reports bit information to the request signal analyzing unit 107. At the request signal analyzing unit 107, information on a location of the terminal apparatus 400 to which distribution is made or information on a number of a mesh it belongs is acquired from bit information reported, and the information is reported to the distribution control unit 103. The distribution control unit 103 reports a mesh number to be distributed to the information distribution unit 104, which requests the distribution mesh storage unit 102 for reporting of information corresponding to the mesh number, and conducts distribution when system information of a region corresponding to the mesh number is acquired.

The distribution control unit 103 which is included in a distribution apparatus usable in the present embodiment may include a unit which changes a mesh configuration or a hierarchized mesh configuration in operation using information such as a frequency with respect to region information for which distribution is requested from the request signal analyzing unit 107. When a change on a mesh configuration or a hierarchized mesh configuration becomes necessary, the distribution control unit 103 reports to the distribution mesh information storage unit 102 information on a configuration to be changed, and the distribution mesh information storage unit 102 organizes distribution control information corresponding to the distribution information type based on information reported.

(Terminal Apparatus (2))

Figure 11:
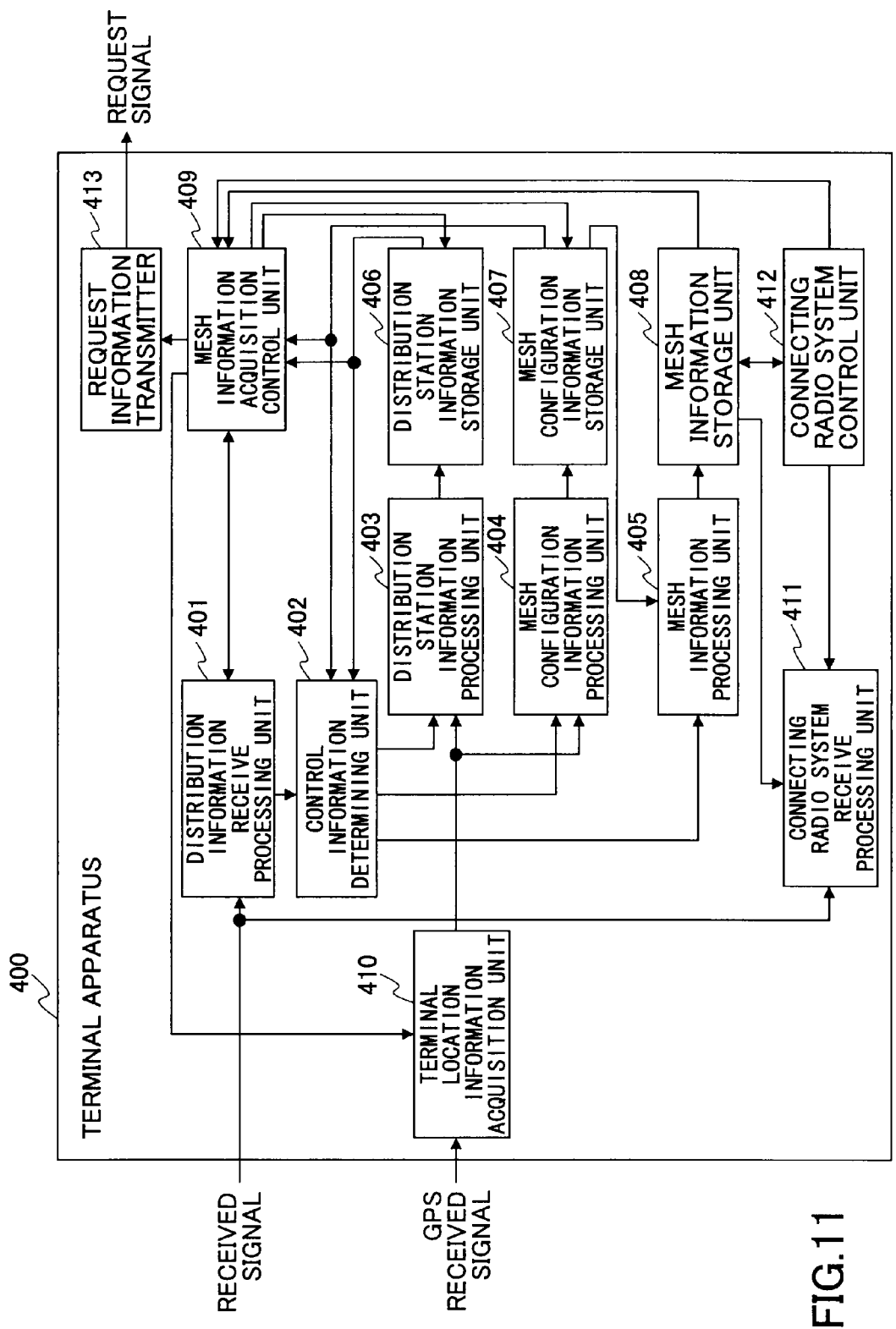
FIG. 11 is a second part of the functional block diagram illustrating the terminal apparatus according to one embodiment.

A terminal apparatus according to the present embodiment is explained with reference to FIG. 11. The terminal apparatus 400 acquires information distributed by the distribution apparatus 100. For example, the terminal apparatus 400 requests a distribution station 100 for distribution when the terminal apparatus does not hold system information of a region to which the terminal apparatus belongs. Then, the terminal apparatus receives a common control signal distributed according to a request for distribution and acquires information on the region to which the terminal apparatus belongs. The method of receive process of the common control signal is the same as a process shown in the terminal apparatus (1). Thus, a portion on a process requesting the common control signal is described. The terminal apparatus 400 according to the present embodiment includes a request information transmitter 413 in the terminal apparatus which is described with reference to FIG. 9.

With system information on a region that is acquired being held in a mesh information storage unit 408, the connecting radio system control unit 412 requests the mesh information storage unit 408 for information in order to acquire information of a radio system which can be connected to when connecting a radio system. When there is no information on a region to which the terminal apparatus 400 belongs, the mesh information storage unit 408 reports, to the mesh information acquisition control unit 409, a request for a common control signal in a region to which it belongs. When the request is received, the mesh information acquisition control unit 409 requests the distribution station information storage unit 406 to output a distribution station number of a belonging distribution station and requests the mesh configuration information storage unit 407 to output a mesh number of a belonging region. Upon receiving the request for output, the distribution station information storage unit 406 reports, if information on the belonging distribution station is obtained, the distribution station number, and if not, the request for distribution station information. Upon receiving the request for output, the mesh configuration information storage unit 407 reports a corresponding mesh number if the mesh configuration information is acquired, and reports a mesh configuration information request if the mesh configuration information is not acquired. Based on a report from the distribution station information storage unit 406 and the mesh configuration information storage unit 407, the mesh information acquisition control unit 409 requests the request information transmitter 413 to transmit a request signal. If the distribution station information is not held, a request for distribution of the distribution station information is made, if the mesh configuration information is not held, a request for distributing the mesh configuration information including a distribution station number of the belonging distribution station is made, and if the mesh information is not held, a request for distributing the mesh information including a mesh number of a belonging region and a distribution station number of a belonging distribution station is made. The request information transmitter 413 transmits a request signal in response to a request for a request signal reported.

(Distribution Apparatus (3))

Figure 12:
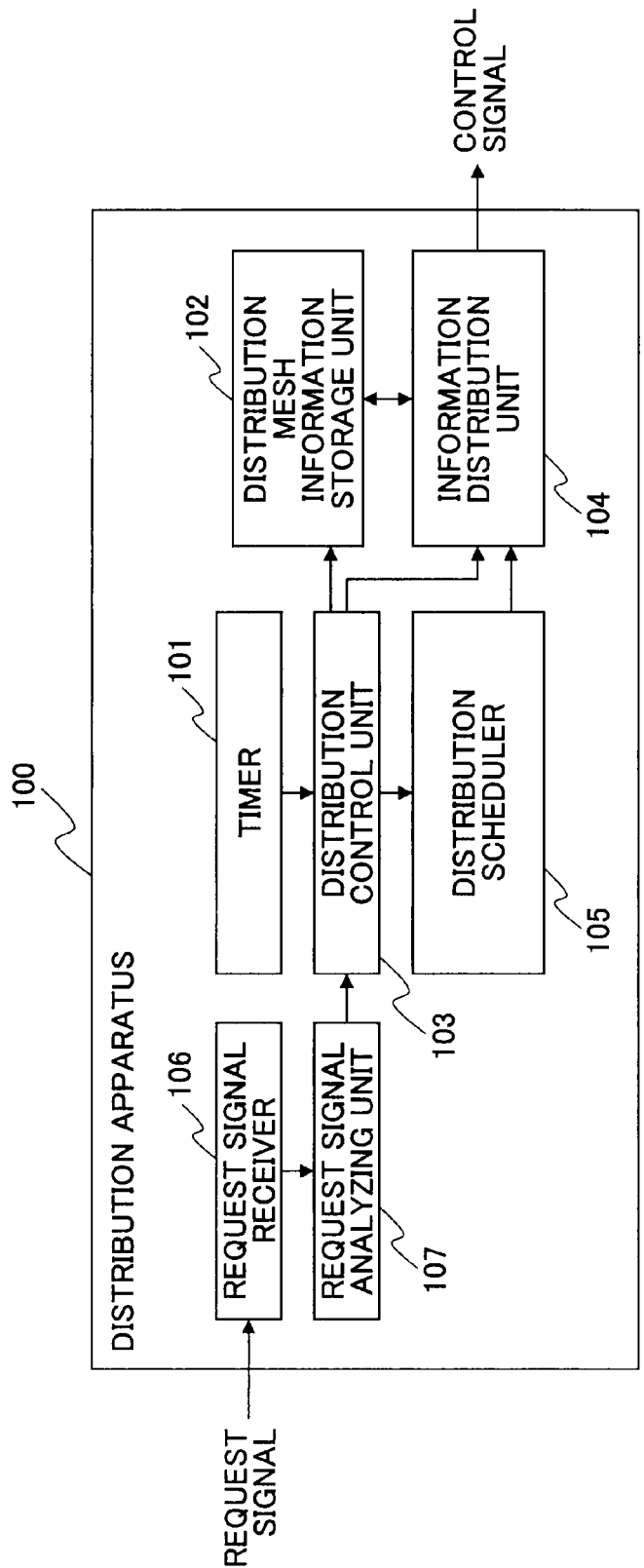
FIG. 12 is a third part of the functional block diagram illustrating the distribution apparatus according to one embodiment.

The distribution apparatus applied to the above-described radio communications system is explained with reference to FIG. 12.

The distribution apparatus 100 according to the present embodiment uses a combined type distribution which distributes according to a request from the terminal apparatus 400 while periodically distributing at the time of distributing the common control signal. In other words, in the distribution apparatus 100, the broadcast-type distribution and the on-demand type distribution are applied.

The distribution apparatus 100 includes a timer 101, a distribution mesh information storage unit 102, a distribution control unit 103, an information distribution unit 104, a distribution scheduler 105, a request signal receiver 106, and a request signal analyzing unit 107.

In the combined-type distribution, in addition to basic functions for conducting the broadcast-type communications, the request signal receiver 106 and the request signal analyzing unit 107 are included which undergoes a receive process of a request signal from the terminal apparatus 400. As each function has the same function as the previous embodiments, the distribution control unit 103 and the distribution scheduler 105, which are significantly different therefrom are described.

The distribution control unit 103 conducts control based on request signal information from the request signal analyzing unit 107 and time information from the timer 101. Based on the time information, a request for distribution is made to the distribution scheduler 105. Based on the request signal information, a request for distribution is made to the information distribution unit 104, and information on distribution information requested is reported to the distribution scheduler 105. Based on information requested and distributed from the terminal apparatus 400, the distribution scheduler 105 updates an internal scheduling process.

According to the present embodiments, multiple meshes are set as one hierarchized mesh, so that information sets which are common are distributed to the hierarchized mesh. For example, such a reporting may be conducted in a common control channel. Information for the multiple meshes may be distributed at once, which improves distribution efficiency. As a result, frequency utilization efficiency may be increased, and efficiency of information distribution and reduction of information amount of a control signal may be achieved.

According to the present embodiments, distribution regions are hierarchized, regions to which the same information is distributed are grouped, thus improving distribution efficiency. As a result, frequency utilization efficiency may be increased and efficiency of information distribution may be achieved. Moreover, with hierarchizing the distribution regions, mesh configuration information of the distribution regions may be distributed to respond to a dynamic change of the mesh configuration.

According to the present embodiments, reporting is made of a mesh configuration which is configured by a distribution station. The mesh configuration includes a mesh location and a hierarchized mesh configuration. By reporting the mesh location, a terminal apparatus can determine and correct the mesh to which the terminal apparatus belongs. Moreover, the mesh configuration may be reported to dynamically change the mesh configuration, making it possible to conduct groupings for conducting highly efficient distribution.

According to the present embodiments, information amount for the distribution station to distribute may be decreased. Thus, an improvement in distribution efficiency and in frequency utilization efficiency may be expected.

According to the present embodiments, a mesh location is reported, so that a different control signal, etc., is not necessary for retrieving mesh location information at the terminal apparatus. Moreover, a mesh configuration can be changed dynamically, making it possible to select an optimal operation method according to the frequency resource utilization status.

For convenience of explanations, the present invention is explained by breaking it down into a number of embodiments or items. However, such a breakdown is not essential to the present invention, so that matters recited in separate embodiments or items may be combined for use as needed. While specific numerical value examples are used to facilitate understanding of the invention, such numerical, values are merely examples, so that any appropriate value may be used unless specified otherwise.

The present invention is not limited to a particular system, so that it may be applied to any appropriate mobile communications systems. For example, the present invention may be applied to W-CDMA, HSDPA/HSUPA, LTE, IMT-Advanced, WiMAX and Wi-Fi systems, etc.

As described above, while the present invention is described with reference to specific embodiments, the respective embodiments are merely exemplary, so that a skilled person will understand variations, modifications, alternatives, replacements, etc. While specific numerical value examples are used to facilitate understanding of the invention, such numerical values are merely examples, so that any appropriate value may be used unless specified otherwise. The breakdown of items in the above embodiment is not essential to the present invention, so that matters described in two or more embodiments or items may be combined for use as needed. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese Patent Application No. 2008-228998 filed on Sep. 5, 2008, the entire contents of which are hereby incorporated by reference.

The invention claimed is:

1. A distribution apparatus which distributes to multiple regions,
one or multiple radio communications systems being usable in each of the regions, the distribution apparatus comprising:
a storage unit which stores each of the radio communications systems usable for each of the regions;
a selecting unit which selects, out of the multiple regions to which the distribution apparatus distributes, first regions in which a radio communications system in operation is the same; and
a distribution unit which distributes, based on each of the radio communications system usable for each of the regions that is stored in the storage unit, all or some of information on the radio communications system for each of the first regions selected by the selecting unit.

2. The distribution apparatus as claimed in claim 1, wherein
the distribution unit distributes belonging information on a region included in the first regions.

3. The distribution apparatus as claimed in claim 2, wherein
the distribution unit distributes information indicating a range or location information of the region included in the first regions.

4. The distribution apparatus as claimed in claim 1, wherein
the selecting unit selects second regions in which a radio parameter is the same, and
the distribution unit distributes some or all of information sets on the radio parameter for each of the second regions.

5. The distribution apparatus as claimed in claim 4, wherein
the distribution unit distributes belonging information on a region which is included in the second regions.

6. The distribution apparatus as claimed in claim 5, wherein
the distribution unit distributes information indicating a range or location information of the region included in the second regions.

7. The distribution apparatus as claimed in claim 4, wherein
the distribution unit distributes some of information on the radio parameter for each of the first or second regions, and
information other than the some of the information is distributed to a region included in the first and second regions.

8. The distribution apparatus as claimed in claim 1, wherein
the storage unit updates each of the radio communications systems usable if a radio communications system usable in an arbitrary region is changed.

9. The distribution apparatus as claimed in claim 1, wherein
the selecting unit periodically re-selects a region included in the first region.

10. The distribution apparatus as claimed in claim 1, wherein
the distribution unit periodically broadcasts information on the radio communications system.

11. The distribution apparatus as claimed in claim 1, wherein
the distribution unit transmits information on the radio communications system according to a request by a terminal apparatus.

12. A terminal apparatus which receives control information distributed by a distribution apparatus, wherein
the distribution apparatus distributes all or some of information on a radio communications system or information on a radio parameter for each of first regions in which the radio communications system in operation is the same or for each of second regions in which the radio parameter is the same out of multiple regions to distribute to,
and wherein the terminal apparatus includes
a receiver which receives the information on the radio communications system or the information on the radio parameter that is transmitted from the distribution apparatus;
a determining unit which determines a radio communications system to connect to, based on the information on the radio communications system or the information on the radio parameter that is received by the receiver; and
a connecting unit which connects to the radio communications system determined by the determining unit.

13. The terminal apparatus as claimed in claim 12, wherein
the distribution apparatus distributes information indicating a range or location information of a region included in the first or the second regions,
the receiver receives information indicating the range or location information of the region included in the first or the second regions,
and the determining unit determines whether the terminal apparatus is positioned in the first regions or the second regions based on the information indicating the range or the location information of the region included in the first regions or the second regions that is received by the receiver.

14. The terminal apparatus as claimed in claim 13, wherein
the distribution apparatus distributes information on the region included in the first regions or the second regions, and
the receiver receives the information on the region included in the first regions or the second regions, and the terminal apparatus further including
an acquisition unit which acquires the information on the region included in the first regions or the second regions in which the terminal apparatus is located based on belonging information on a region included in the first region or the second region that is received by the receiver.

15. The terminal apparatus as claimed in claim 14, wherein
the acquisition unit acquires information on a region included in the first regions or the second regions in which the terminal apparatus is located based on attribute information of a region included in the first region or the second region that is received at the receiving unit when it is determined by the determining unit that the terminal apparatus is located in the first or the second regions.

16. The terminal apparatus as claimed in claim 14, wherein the distribution apparatus distributes some of information sets on the radio parameter or information sets on the radio communications system that is the same for each of the first regions in which the radio communications system in operation is the same or for each of the second regions in which the radio parameter is the same out of multiple regions to distribute to and distributes information other than the some of the information sets on the radio communications system or the information sets on the radio parameter that are the same to a region included in the first regions or the second regions, and the receiver receives the information other than the some of the information on the radio communications system or the information on the radio parameter that is distributed to a region included in the first regions or the second regions when it is determined by the determining unit that the terminal apparatus is located in the first regions or the second regions, and the acquisition unit acquires all of information sets on a radio communications system or information sets on a radio parameter of a region included in the first regions or the second regions in which the terminal apparatus is determined to be located based on information received from the receiver.

17. The terminal apparatus as claimed in claim 12, further comprising
a transmitter which transmits a signal requesting that information on a radio communications system be transmitted.

18. A system including a distribution apparatus which distributes to multiple regions and a terminal apparatus which receives control information distributed by the distribution apparatus,
one or multiple radio communications systems being usable in each of the regions, the distribution apparatus comprising:
a storage unit which stores each of the radio communications systems usable for each of the regions;
a selecting unit which selects, out of the multiple regions to which the distribution apparatus distributes, first regions in which a radio communications system in operation is the same or second regions in which a radio parameter is the same;
a distribution unit which distributes, based on each of the radio communications systems usable that is stored in the storage unit, all or some of information on the radio communications system or information on the radio parameter for each of the first regions or the second regions which are selected by the selecting unit, and wherein the terminal apparatus comprises
a receiver which receives information on a radio communications system or information on a radio parameter that is transmitted from the distribution apparatus;
a determining unit which determines a radio communications system to connect to, based on information on a radio communications system or information on a radio parameter that is received by the receiver; and
a connecting unit which connects to the radio communications system determined by the determining unit.

19. A method in a system including a distribution apparatus which distributes to multiple regions and a terminal apparatus which receives control information distributed by the distribution apparatus,
one or multiple radio communications systems being usable in each of the regions, the distribution apparatus comprising:
a selecting step of selecting, out of the multiple regions to which the distribution apparatus distributes, first regions in which a radio communications system in operation is the same or second regions in which a radio parameter is the same;
a distribution step of distributing, based on each of the radio communications systems usable that is stored in the storage unit, all or some of information on the radio communications system or information on the radio parameter for each of the first regions or the second regions which are selected by the selecting step, and the terminal apparatus comprising:
a receiving step which receives information on a radio communications system or information on a radio parameter that is transmitted from the distribution apparatus;
a determining step which determines a radio communications system to connect to, based on information on a radio communications system or information on a radio parameter that is received by the receiving step; and
a connecting step which connects to the radio communications system determined by the determining step.

* * * * *